United States Patent [19]
Thiemann et al.

[11] Patent Number: 6,054,835
[45] Date of Patent: Apr. 25, 2000

[54] STEPPING MOTOR CONTROL, AND OPERATING MODE OF SUCH MOTORS

[75] Inventors: Peter Thiemann, Munich; Jens Umlauf, Mering; Hermann Andresen, Weidenbach, all of Germany

[73] Assignee: Océ Printing Systems GmbH, Poing, Germany

[21] Appl. No.: 09/284,920

[22] PCT Filed: Oct. 16, 1997

[86] PCT No.: PCT/DE97/02391

§ 371 Date: Jul. 1, 1999

§ 102(e) Date: Jul. 1, 1999

[87] PCT Pub. No.: WO98/18200

PCT Pub. Date: Apr. 30, 1998

[30] Foreign Application Priority Data

Oct. 22, 1996 [DE] Germany ............ 196 43 624

[51] Int. Cl.[7] .............. H02P 8/00; H02P 8/12; B41J 19/00

[52] U.S. Cl. ............ 318/685; 318/696; 400/279; 400/322

[58] Field of Search ............ 318/138, 254, 318/685, 696; 358/409; 400/279, 322, 903; 347/37; 346/76 PH

[56] References Cited

U.S. PATENT DOCUMENTS

| | | |
|---|---|---|
| 3,855,515 | 12/1974 | Hutchins, Jr. . |
| 5,008,607 | 4/1991 | Ono et al. ............ 318/696 |
| 5,871,291 | 2/1999 | Kawazoe ............ 400/279 |

FOREIGN PATENT DOCUMENTS

| | | |
|---|---|---|
| 0 414 436 A2 | 2/1991 | European Pat. Off. . |
| 42 20 201 A1 | 2/1993 | Germany . |

*Primary Examiner*—Paul Ip
*Attorney, Agent, or Firm*—Hill & Simpson

[57] ABSTRACT

A method and apparatus for operating stepping motors in a printer or copier senses temporarily changes in the moment of resistance caused by the introduction of the leading edge of the paper and overcomes this change in moment by changing the current amplitude to the motor windings. The currents are modified at a starting time, as determined by sensors.

11 Claims, 2 Drawing Sheets

$$\hat{I}(t) = k * M(t)$$

$\hat{I}(t) = k * M(t)$

STEPPING MOTOR CONTROL, AND OPERATING MODE OF SUCH MOTORS

BACKGROUND OF THE INVENTION

1. Field of the Invention

The present invention relates to the use of stepping motors, particularly in the field of printing technology and of copier technology. In high-performance printers, for example, thus, a plurality of two-phase stepping motors are utilized for transporting a carrier material, which is preferably paper, from a paper input to a printing unit, past a fixing station up to a paper output. Continuous form paper or single sheet paper is utilized as the paper for printing.

2. Description of the Related Art

In addition to the advantages such as high step resolution and high positioning precision, however, stepping motors also have disadvantages. Thus, stepping motor controls are usually offered for three operating conditions. During standstill, the windings or, respectively, phases of the stepping motor are supplied with a low maintaining current. Upon acceleration of the stepping motor in an acceleration phase, a current having a very high current amplitude is utilized. When the stepping motor has reached its operating speed, then a switch can be made into a running operating condition wherein the current amplitude of the winding currents lies between that in standstill and that in the acceleration phase. An adaptation of the operating behavior to a time-variable load moment can only be roughly achieved, i.e. over the three operating conditions. In order to prevent the stepping motor from falling out of step, in minimum value of the torque reserve must not be downwardly transgressed either in the acceleration phase or in the running condition, this assuring that the difference of the drive moment and the load moment does not fall below a predetermined value. The greatest load moment occurring must thereby be taken into consideration; this, however, only occurs at times during operation of the stepping motor, so that the momentary torque reserve is usually higher than the predetermined minimum value. Accordingly, the stepping motor is supplied with too much energy. This energy is converted into disturbing fluctuations of the speed, into heat, running noises and other undesired side effects.

A known possibility for preventing these disadvantages is comprised therein that the amplitudes of the phase currents are varied such with the assistance of a control during operation of the stepping motor that the torque reserve respectively has exactly the predetermined minimum value. To that end, the load moment during operation of the stepping motor is determined, i.e. in real time, in that, for example, the actual position of the rotor of the stepping motor is constantly acquired with the assistance of an optical sensor unit. The amplitude of the phase currents and/or the load angle is employed as a manipulated variable. The outlay for constructing a complete control circuit with sensors, comparator means and actuator unit is disadvantageous. The demands made of the sensors and of the controller are generally extremely high since stepping motors should have a high positioning precision given a high running performance. For example, a relatively complicated four-quadrant control is employed as the current regulation in order to produce a symmetrical behavior both for building up the current a well as for dismantling, or decreasing the current.

A first aspect of the invention is directed to a method for the operation of a stepping motor wherein the load moment changes over time given an essentially identical speed. Such a situation occurs, for example in the high-performance printer, when a paper edge is drawn through between two fixing drums pressed against one another with extremely high pressure at the beginning of the fixing process. A sudden rise and subsequent, sudden drop of the load moment thereby occurs. In known high-performance printers, a brief-duration reduction of the speed of the fixing drums occurs due to the discontinuous course of the load moment, this leading to a discontinuous paper running. Given discontinuous paper running, the paper is more highly stressed compared to a uniform paper running. In the extreme case, tears in the paper to be printed can even occur. Given non-uniform paper running, moreover, dislocations of the paper relative to rated positions occur. Such dislocations can already lead to a visibly poorer printing quality in the range of a few hundredths of a millimeter.

U.S. Pat. No. 3,855,515 discloses that the time curve of the load moment be identified in a measuring procedure and that the amplitude values for the winding currents of a stepping motor be determined dependent on the curve of the load moment. Beginning from a starting time, the motor is supplied such with winding currents during operation that the motor consumes no more power then needed for driving the load. In this way, the dissipated power of the motor and of the control are reduced.

German Patent document DE 42 20 201 A1 discloses a conveyor means having at least one fixing drum that is driven by a stepping motor. A detector means acquires the transport speed of the transported sheet of paper, whereby this transport speed is kept constant with the assistance of the detector signals.

SUMMARY OF THE INVENTION

An object of the first aspect of the invention is to provide a simple method for the operation of a stepping motor given an approximately constant speed and time-variable load moment, whereby the stepping motor is particularly utilized in an electrophotographic single-sheet printer for driving a fixing drum.

This object is achieved by a method for operating a stepping motor in a printer or copier device, whereby the load moment changes over time given essentially identical speed, the time curve of the load moment is determined in a measuring procedure, a curve of the amplitude values for the winding currents of the stepping motor is determined dependent on the curve of the load moment such that the amplitude values are opposite buried given changing load moment, whereby, subsequently, the winding currents beginning at a starting time are modified according to the identified amplitude curve, whereby the cycle duration of the winding currents is constant, and whereby the transport of the single sheet in the printer is acquired with a sensor and the starting time is determined dependent on the sensor signal. The first aspect of the invention is based on the consideration that the curve of the load moment returns qualitatively unmodified at specific points in time when the stepping motor is utilized for the same job over a longer time span. In the invention, thus, the time curve of the load moment is identified in a measuring procedure. Known methods for determining a load moment can be employed for the measuring.

In the first aspect of the invention, a curve of amplitude values for the winding currents of the stepping motor is determined such from the curve of the load moment that the amplitude values are modified in the same direction given a changing load moment. This means that the amplitude becomes greater given increasing load moment and that the amplitude values become smaller given decreasing load moment.

In the first aspect of the invention, the winding currents are modified according to the identified amplitude curve beginning at a starting time after the end of the measuring procedure and after the determination of the amplitude values. The starting time coincides with the points in time at which the curve of the load moment reoccurs, so that load moment curve and amplitude value curve are synchronous with one another. The amplitude value curve is superimposed on the known curve of current for an operation of the stepping motor in full step, half step or micro-step operation. In the first aspect of the invention, thus, a modulation of the current amplitude of the winding currents ultimately occurs with a modulation quantity similar to the curve of the load moment. The cycle duration of the winding currents remains constant in the first aspect of the invention since the speed of the stepping motor should be optimally constant over time. What is achieved by the first aspect of the invention is that, due to the modified amplitude values, the drive moment of the stepping motor also varies, so that no variation of the speed due to an increasing load moment occurs. The average electrical load angle also remains constant at about 90° as a result of the first aspect of the invention. In the second aspect of the invention, thus, the drive moment and the load moment are matched to one another. Exactly that energy that is required is thus supplied to the stepping motor. A complicated regulation can be eliminated in the first aspect of the invention. The method according to the first aspect of the invention is simple since most method steps are implemented only a single time, for example the measuring procedure.

In an exemplary embodiment of the first aspect of the invention, the stepping motor drives at least one fixing drum for fixing the toner image on at least one single sheet in an electrophotographic single-sheet printer, whereby the starting time is determined roughly by the beginning of the fixing of the toner image. Each single sheet has what is a leading edge as seen in the transport direction that is usually pulled in between two fixing drums. Given the same paper at the same paper thickness, essentially the same load moment curve derives at every draw-in, so that this curve need only be identified once in the measuring procedure. For example, a separate load moment curve thus derives for each paper thickness. The starting time for modifying the amplitude values according to the modified load moment curve lies either immediately before the beginning of the fixing of the toner image or before the beginning of the fixing by a specific delay time. What the exemplary embodiment achieves is that a sudden speed reduction and subsequent sudden speed increase due to a discontinuity in load moment is avoided upon draw-in of the paper. Consequently, the paper is fixed by the fixing drum with uniform speed, so that excessive stresses on the paper are precluded.

In a further exemplary embodiment of the first aspect of the invention, the fixing drum is arranged at a distance from a transfer printing station for the application of the toner image that lies within the heat length of the single sheet in the transport direction. In this case, the fixing drum can be attached in a compact structure at a slight distance behind the transfer printing station, so that a smearable toner image applied by the transfer printing station is already fixed after a short conveying path and a smearing of toner particles by the transport is precluded. What this exemplary embodiment of the invention also achieves is that a reaction of the fixing process of the transfer printing process is precluded since the sheet is fixed with and uniform speed in the exemplary embodiment of the invention. If this were not the case, reactions on the transfer printing process would occur as a result whereof the toner image would already be smeared upon application. This is all the truer the thicker the carrier material to be printed is.

In a second aspect, the invention is directed to a stepping motor control for the implementation of the method according to the first aspect of the invention or, respectively, of the method according to one of the exemplary embodiments of the first aspect of the invention. The aforementioned technical effects are thus also transferred onto this stepping motor control.

In a third aspect, the invention is directed to a method for the operation of a stepping motor given time-variable speed, i.e. given accelerations or, respectively, retardations according to a predetermined speed ramp. The load moment can have both a constant value given variation of the speed and can also have a variable value. That which was stated above is valid with respect to the torque reserve, so that too great a torque reserve given variable speed also leads to the negative effects. The drive moment characteristic of a stepping motor usually has a curve that drops greatly toward higher speeds.

At low speeds, the stepping motor is driven in what is referred to as start-stop mode wherein the stepping motor starts and stops error-free with the predetermined speed. The speed of the ramp has a discontinuous shape in this case.

In a medium speed range in which the drive moment of the stepping motor drops only insignificantly, linear speed ramps are usually employed, i.e. the speed increases or, respectively, decreases linearly over the time. Even given constant load moment, however, the torque reserve varies considerably in this case due to the drop of the drive moment characteristic toward higher speeds. In particular, the torque reserve given constant amplitude of the phase currents is greater at low speeds of the ramp than at higher speeds. An excess of energy that leads to the aforementioned side effects is thus regularly supplied to the stepping motor at the beginning of the ramp given an ascending ramp.

When acceleration is to be carried out up to a high speed range, then ramps having an exponential course are employed, whereby, in a fashion adapted to the curve of the drive moment characteristic, the acceleration at high speeds is less than at medium and at lower speeds. These ramp shapes, however, require an increased circuit-oriented and software-oriented outlay.

However, all of the solutions fail when the ramp form is prescribed by the system, i.e. given applications wherein stepping motors are typically utilized. In addition, the stepping motors must often be synchronized to externally prescribed clock signals or must be accelerated ideally synchronized with other drives, so that the ramp shape of these must be assumed. Particularly in printing technology, ramps without acceleration discontinuity are required, i.e., for example with a curve similar to a tangent-hyperbola function, in order, for example, to not excessively stress sensitive the paper webs.

An object of the third aspect of the invention is to provide a simple method for the operation of a stepping motor, whereby the energy supplied to the stepping motor is essentially adapted to the load moment given variable speed.

This object is achieved by a method for operating a stepping motor, whereby the windings of the stepping motor are driven with current pulses having a defined current amplitude; the load moment characteristic is determined over the speed in a measuring procedure; the drive moment characteristics of the stepping motor are determined over the speed for a plurality of current amplitude through; the time curve of the speed of the stepping motor is predetermined according to a ramp function; dependent on the respective speed value through, that current amplitude at which the torque reserve from drive moment minus load moment lies within a predetermined range is selected from the drive moment characteristic; and whereby, after the determination of the load moment characteristic, the stepping motor is driven beginning at a starting time with current pulses of the selected current amplitudes according to the predetermined speed curve, whereby the cycle duration of the winding currents changes according to the predetermined speed curve. The third aspect of the invention again proceeds from the consideration that, given the stepping motors under consideration here, the load moment given repeated, identical variation of the speed, varies in a way that always re-occurs identically. In the third aspect of the invention, therefore, the load moment characteristic is determined via the speed in a measuring procedure. Dependent on the system demands, the measuring procedure can be comprised only of a recourse to a guideline for the load moment that lies determined once at some time or other or can be determined by a plurality of load moment measurements at different speeds at the system driven by the stepping motor. A calculation or simulation of the load moment characteristic is also interpreted as a measuring procedure, whereby the result of the calculations is then checked during operation of the stepping motor.

In the third aspect of the invention, drive moment characteristics of the stepping motor are identified via the speed for a plurality of current amplitudes. The determination of the drive moment characteristics can ensue by measuring the drive moments of the stepping motor for various current amplitudes, respectively over the entire speed range. Another way is comprised in offering a formula that, dependent on the speed, indicates the drive moment for various current amplitudes or, respectively, offering a plurality of formulas that are respectively valid for a specific range of the current amplitude.

In the third aspect of the invention, moreover, the curve of the speed of the stepping motor must be predetermined according to the ramp function. The ramp function can be one of the three types or can have a different course that is compelled by the respective system or, respectively, that is expedient given the respective system.

Dependent on the respective speeds of the predetermined speed curve, that drive moment characteristic at which the torque reserve from drive moment minus load moment lies within a predetermined range is respectively selected from the drive moment characteristics. This range is upwardly established by a prescription for the maximally desired torque reserve. Downward, a limitation occurs first, due to the respective required load moment and, second, due to a small torque reserve with respect to the load moment. The selected drive moment characteristic is unambiguously allocated to a specific current amplitude that is then allocated to the speed value under consideration as the selected current amplitude. The range can also be limited to a rated drive moment characteristic.

After the determination of the load moment characteristic and, preferably, after the determination of the selected current amplitudes, the stepping motor—in a third aspect of the invention—is driven with current pulses of the selected current amplitude according to the predetermined speed curve beginning at a starting time, whereby the cycle duration of the winding currents changes according to the predetermined speed curve. Since the torque reserve does not exceed the predetermined limit value, the stepping motor is essentially supplied with only as much energy as it needs for proper operation. Excessive heating, loud running noises or a vibration of the motor are prevented. The method according to the third aspect of the invention is simple, since most method steps need be implemented only once, for example determining the load moment characteristic, determining the drive moment characteristic, selecting the current amplitudes.

In an exemplary embodiment of the third aspect of the invention, the stepping motor drives the part of the transport system for transporting sheet-shaped carrier material in an electrophotographic high-performance printer. Since a plurality of stepping motors are usually employed for driving the transport system, synchronous running between the stepping motors must be assured, particularly given continuous form paper, and, second, the positive effects as a result of the invention are multiplied given operation of a plurality of stepping motors. Increased demands are made of the drive of the stepping motors, particularly given transport of sheet-shaped carrier material, since a high load on the sensitive carrier material must be avoided during transport.

In a method according to the third aspect of the invention, the specific current amplitude values ultimately superimpose the current amplitude in full-step, half-step or micro-step operation without modifying the current amplitude, so that a current modulation is implemented.

In a fourth aspect, the invention is directed to a stepping motor control having a drive unit for driving the windings of a stepping motor with currents having a time-variable amplitude; having an output unit for outputting at least one curve of the speed of the stepping motor and for outputting a curve of current amplitude values allocated to the speed curve; and having a control unit for controlling the output unit such that the amplitude values are output to the drive unit beginning at a starting time synchronously with the variation of the speed according to the speed curve, whereby the torque reserve of the stepping motor from drive moment minus load moment lies within a predetermined range for the implementation of the method or, respectively, of exemplary embodiments of the method according to the third aspect of the invention. The technical effects cited thereat are thus transferred to the stepping motor control as well.

BRIEF DESCRIPTION OF THE DRAWINGS

The invention is explained below with reference to the drawings.

DETAILED DESCRIPTION OF THE PREFERRED EMBODIMENTS

Figure 1A:
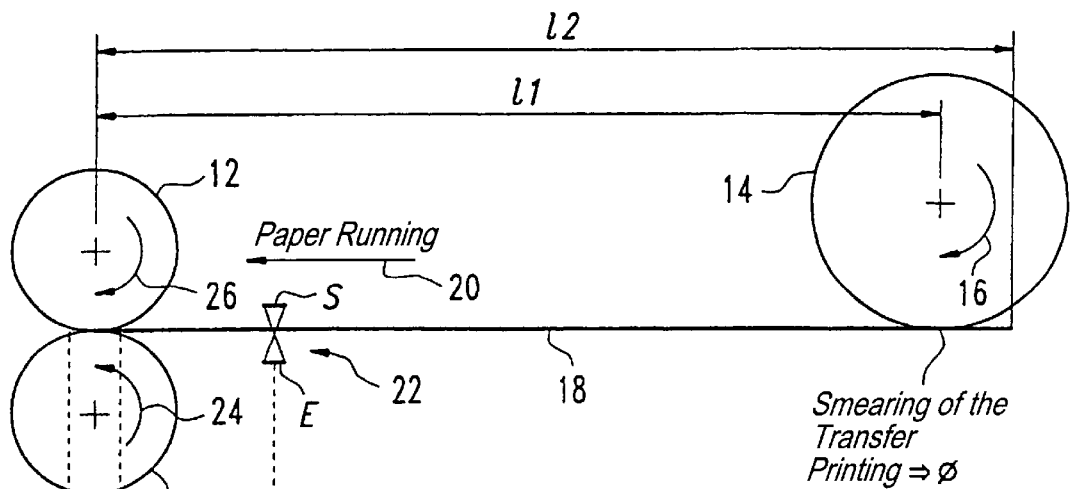
FIG. 1a is a schematic diagram of fixing drums.

The determination of the current amplitudes for phase currents for a stepping motor for driving fixing drums 10 and 12 of an electrophotographic printer is explained below with reference to FIG. 1a, 1b and 1c. FIG. 1a shows a photoconductor drum 14 of the electrophotographic printer that turns in the direction of an arrow 16. A sheet 18 of paper is conveyed past the photoconductor drum 14 in the conveying direction as indicated by an arrow 20. When the sheet 18 of paper is conveyed past the photoconductor drum 14, a toner image is transferred from the photoconductor drum 14 onto the sheet 18 of paper with the assistance of a corona means (not shown).

The sheet 18 of paper is conveyed in the conveying direction 20 to the fixing drums 10 through 12, whereby the sheet 18 of paper is conveyed past a light sensor unit 22 composed of a light source S and of a light-sensitive element E. The sensor unit 22 generates a sensor signal as soon as what is the leading paper edge of the sheet 18 of paper as viewed in the conveying direction 20 interrupts the light beam of the light source S onto the light-sensitive element A. The paper edge subsequently proceeds between the fixing drums 10 and 12, which rotate oppositely in the direction of arrows 24 and 26 with a constant speed w, so that the sheet 18 of paper is drawn between the two fixing drums 10 and 12 as soon as the leading paper edge is seized by the fixing drums 10 and 12. The fixing drum 12 is heated and has a temperature of approximately 220° C. on its surface. Additionally, the two fixing drums 10 and 12 are pressed against one another with a high pressure. As a result thereof, the toner image on the sheet 18 of paper is fused into the sheet 18 of paper under high pressure at the fixing temperature during the fixing procedure and is thus fixed.

The fixing drums 10 and 12 are arranged at a distance 11 from the photoconductor drum 14. The distance 11 is shorter then the length 12 of the sheet 18 of paper in the conveying direction 20. The compact structure of the printer derives due to this arrangement of fixing drums 10 and 12 as well as the photoconductor drum 14.

Figure 1B:
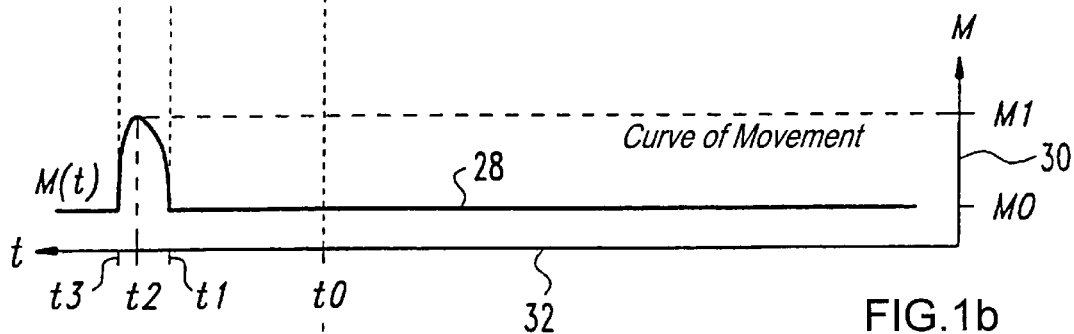
FIG. 1b is a graph of moment.

FIG. 1b shows a curve 28 of the load moment M over the time t. The load moment M is thereby shown on the ordinate axis 30 and the time t is shown on the abscissa axis 32. At a time t0, the sheet 18 of paper is conveyed past the sensor unit 22. At a time t1, which lies after the time t0 in time, the leading paper edge reaches the two fixing drums 10 and 12. An increased torque is needed for drawing the sheet 18 of paper in between the two fixing drums 10 and 12. This torque is greater than a torque M0 that is required in order to turn the two fixing drums 10 and 12 in opposite directions despite the high, mutual pressing power without a sheet 18 of paper lying therebetween. Since the surfaces of the two fixing drums 10 and 12 are composed of an elastic material, a deformation job must be performed upon penetration of the paper edge of the sheet 18 of paper between the two fixing drums 10 and 12, this leading to the increased load moment. At a time t2, the load moment M reaches a maximum value M1. The torque M in turn drops relatively quickly after the edge is drawn in, dropping to approximately the initial value M0 at a time t3 that lies following the time t2. The load moment M thus has a rather discontinuous rise up to time t2 when the paper edge of the paper sheet 18 is seized by the two fixing drums 10 and 12 and subsequently has a discontinuous drop up to time t3.

Figure 1C:
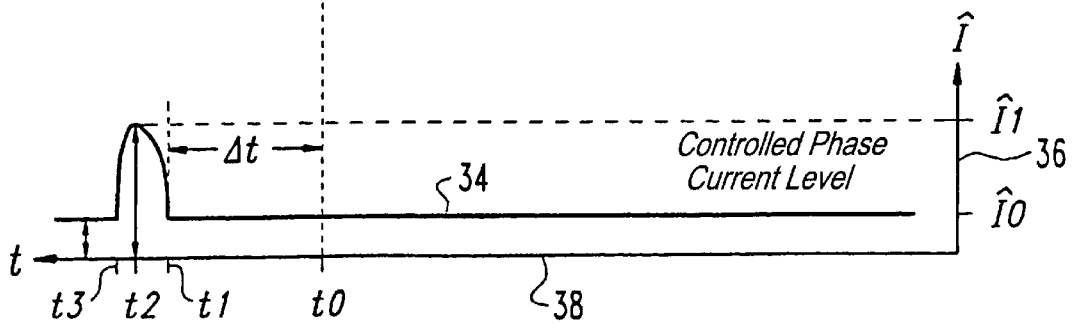
FIG. 1c is a graph showing the calculation of the current amplitudes of the phase currents for a stepping motor for driving the fixing drums of an electrophotographic printer.

FIG. 1c shows the amplitude curve 34 for the phase currents in the windings of the stepping motor which is calculated from the load moment curve in part FIG. 1b. The current amplitude Î(t) is thereby shown on the ordinate axis 36 and the aforementioned time t is shown on the abscissa axis 38. The current amplitude Î(t) of the phase currents is calculated from the load moment curve M(t) recited in FIG. 1b, being calculated according to the following equation:

$$\hat{I}(t) = k * M(t) \quad (1),$$

whereby k is a permanently prescribed proportionality factor. A current amplitude Î0 thus derives at times t0 and t1. At time t2, i.e. when the maximum load moment M1 occurs, the current amplitude Î also has its maximum value Î1. At time t3, the current amplitude Î has again dropped to the value Î0. When, for example, the current amplitude Î is three times as great as the current amplitude Î0, then the current amplitude value for a step of the stepping motor at time t2 will lie three times higher than the current amplitude for a step at time t1 or t3. When the current amplitude Î changes repeatedly within the cycle of the phase currents, then the respective amplitude value Î may potentially not even be reached before another amplitude value Î is activated. In the extreme case, the amplitude value Î changes at every step, so that the amplitude values Î degenerate to momentary values, as is the case given full-step operation. A current amplitude modulation of the phase currents thus ultimately arises, whereby the momentary curve 28 ( FIG. 2b) is modulated onto the phase current curve given a predetermined, constant speed of the phase motor and phase currents having the amplitude value Î0. The frequency of the winding currents is constant and matched to the angular velocity w of the fixing drums 10 and 12, whereby a gearing is potentially employed between the stepping motor and fixing drums. Despite the modified load moment M, the angular velocity w remains constant in the first exemplary embodiment. The average electrical load angle lies at 90° independently of load moment.

Since the current amplitudes I are only modified at points in time at which a new step of the stepping motor begins, the current amplitude values also need be identified only at these discrete points in time. Accordingly, it is also adequate to only identify the moment curve 28 at discrete points in time tn.

When the current amplitudes Î were identified at the points in time tn, then they are stored in a memory unit. During operation of the printer, the sensor signal is generated by the sensor unit 22 at time t0. Subsequently and following a delay Δt, the stored current amplitude values În are communicated to the current regulator of the stepping motor, which generates a current with the predetermined current amplitude. Power drivers likewise supply the winding current into the windings of the stepping motor as warranted. The delay Δt makes it possible to attach the sensor somewhat in front of the fixing drums 10 and 12 as viewed in the conveying direction 20 where more installation space is present.

Alternatively to the memory unit, an output unit can also be employed that stores a function for approximating the load moment and appertaining function parameters. The current amplitude values Î are then calculated in real time during operation of the stepping motor with the assistance of the approximation function.

In a second exemplary embodiment, FIG. 2 shows the determination of the current amplitudes of the phase currents for a stepping motor given variation of the speed according to a ramp.

Figure 2A:
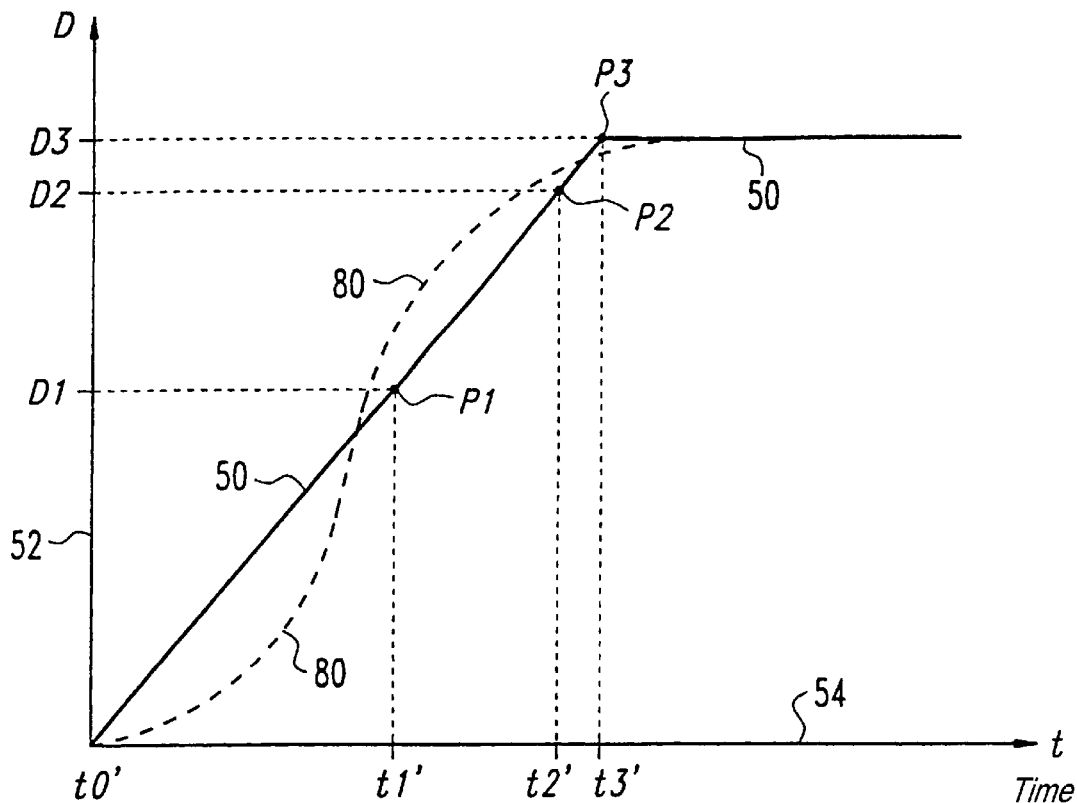
FIGS. 2a and 2b are graphs showing the determination of the current amplitudes of the phase currents for a stepping motor given variation of the speed according to a speed ramp.

The ramp 50 is shown in FIG. 2a, whereby the speed D is shown on the ordinate axis and the time t is shown on the abscissa axis. Proceeding from a point in time t0' having a speed D of zero revolutions per minute, the speed is linearly increased up to a speed D3 at a time t3'. Subsequently, the speed remains at the speed value D3 for a predetermined time following the time t3', so that the stepping motor runs with a constant speed. The rated speeds D can be read from the ramp 50 at various points in time in that, for example for a point in time t1', the intersection P1 with the ramp in vertical direction is identified. Subsequently, the speed value belonging to the intersection P1 is identified in that a vertical line from the intersection P1 is extended up to the speed axis or, respectively, the ordinate axis 52, so that the speed value D1 derives. The speed for a point in time t2' is determined in the same way upon employment of the intersection P2 to D2. The aforementioned speed D3 derives at a point in time t3' with the assistance of an intersection P3. The stepping motor is accelerated with a constant value from point in time t0' up to point in time t3'.

Figure 2B:
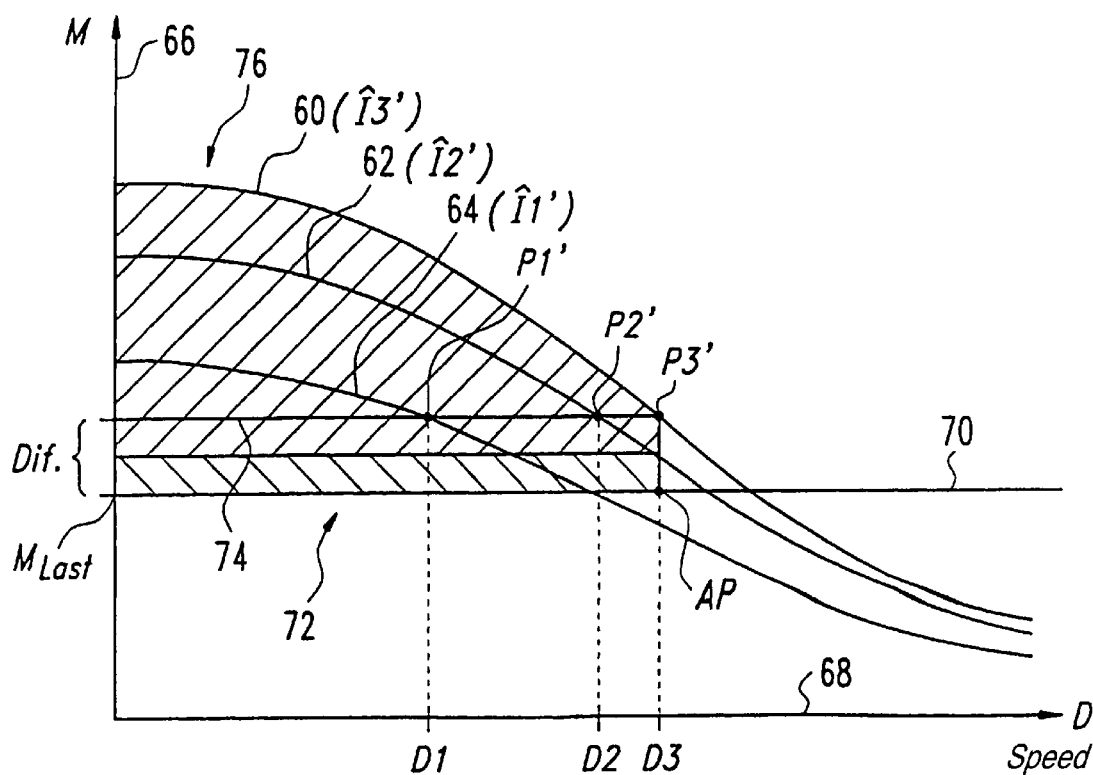

FIG. 2b shows three characteristics 60, 62 and 64 from a plurality of drive moment characteristics of the stepping motor over the speed. The load moment M is shown on the ordinate axis 66 and the speed D is shown on the abscissa axis 68. The drive moment characteristic 64 is valid for a current amplitude $\hat{I}1'$; the drive moment characteristic 62 is valid for a current amplitude $\hat{I}2'$, whereby the current amplitude value $\hat{I}2'$ is greater than the current amplitude $\hat{I}1'$; and the drive moment characteristic 60 is valid for a current amplitude $\hat{I}3'$ whose value lies above the current amplitude value $\hat{I}2'$.

FIG. 2b also shows the curve 70 of the load moment MLoad. For simplified illustration, the load moment MLoad is constant over the speed D. Given other load moment curves, the described method is applied analogously. A shaded region 72 indicates the torque that must be additionally exerted for the acceleration for the load moment MLoad. In order to assure a reliable operation of the stepping motor, further, a safety margin moment in addition to the load moment MLoad and the moment for the acceleration must also be taken in consideration, so that a rated drive moment curve 74 that is constant over the speed D derives.

If the stepping motor were accelerated, for example, with the current amplitude $\hat{I}3'$ according to the ramp 50 (see Part a of FIG. 2), then the torque reserve becomes smaller with increasing speeds D. This situation is illustrated by a second shaded region 76. The torque reserve 76 is extremely high at lower speeds, so that too much energy is supplied to the stepping motor, this leading to the known negative effects such as a tenency of the stepping motor to vibrate, generate heat or to generate loud running noise. In order to prevent these effects, different current amplitudes $\hat{I}$ are determined for different speeds D.

A vertical line up to an intersection P1' with the torque curve 74 is thereby shown for the speed D1. Subsequently, the drive moment characteristic 60 through 64 is selected that proceeds exactly through the intersection P1' or, on the other hand, at least in its proximity. Since the drive moment characteristic 64 proceeds through the intersection P1', the current amplitude $\hat{I}1'$ thereof is allocated to the speed D1 or, respectively, to the point in time t1'.

An intersection P2' on the torque curve 74 is analogously determined for the speed D2. The drive moment characteristic 62 proceeds through the intersection P2', so that the current amplitude value $\hat{I}2'$ belonging to this drive moment characteristic 62 is allocated to the speed D2 or, respectively, to the point in time t2'. An intersection P3' through which the drive moment characteristic 60 proceeds is identified for the speed D3 on the torque curve 74, so that the current amplitude value $\hat{I}3'$ thereof is allocated to the speed D3 or, respectively, to the point in time t3'.

The vertical line at the speed D3 also intersects the load moment curve 70 in an intersection AP that corresponds to the operating point of the stepping motor at the end of the acceleration. At the speed D3, the remaining torque reserve is very small compared to the load moment curve 70, so that a certain safety margin for small fluctuations to the load moment MLoad is established for points in time tn>t3'.

The method for determining the current amplitudes shown on the basis of FIG. 2a can also be employed given modified ramps 50, for example according to a function that is similar to the tangent-hyperbola function. Such a curve is illustrated with a ramp 80 in FIG. 2a. When the stepping motor is utilized in a printer for driving a paper transport, then a transport system that does not excessively stress the paper derives with a ramp 80. Given continuous form paper, this property is even more in the foreground.

The identified current amplitude values $\hat{I}1'$ through $\hat{I}3'$ are stored together with the speeds D1 through D3 in a memory. Beginning at a point in time t0', these values are output to a drive unit of the stepping motor by a control unit, this drive unit supplying the windings of the stepping motor with currents having the current amplitudes $\hat{I}1'$ through $\hat{I}3'$ and frequencies predetermined by the allocated speeds D1 through D3.

Alternatively to the memory, an output unit can also be employed that only stores function expressions for the load moment curve and/or for the torque curve. With these function expressions, the respective speed and current amplitude belonging to specific times are then calculated in real time upon utilization of a processor.

Although other modifications and changes may be suggested by those skilled in the art, it is the intention of the inventors to embody within the patent warranted hereon all changes and modifications as reasonably and properly come within the scope of their contribution to the art.

We claim:

1. A method for operating a stepping motor in a printer or copier device, wherein load moment changes over time given essentially identical speed, comprising the steps of:
    determining a time curve of the load moment in a measuring procedure,
    determining a curve of amplitude values for winding currents of the stepping motor dependent on the curve of the load moment such that the amplitude values are varied in the same direction given changing load moment,
    subsequently modifying the winding currents beginning at a starting time according to identified amplitude curve so that cycle duration of the winding currents is constant,
    acquiring transport of the single sheet in the printer with a sensor, and
    determining starting time dependent on a sensor signal of the sensor.

2. A method according to claim 1, further comprising the steps of:
    driving at least one fixing drum for fixing the toner image on at least one single sheet in an electrophotographic single-sheet printer by a stepping motor; and
    approximately determining starting time by a start of fixing of the single sheet.

3. A method according to claim 2, further comprising the step of:
    arranging a fixing drum at a distance from a transfer printing station for applying toner image that is smaller then the sheet length of the single sheet in a conveying direction.

4. A method according to claim 1, further comprising the step of:
    determining a time curve of the load moment at points in time that are defined by a step frequency of the stepping motor and said speed.

5. A method according to claim 1, further comprising the step of:

forming amplitude values by multiplication of allocated load moment values by a predetermined proportionality factor.

6. A method according to claim 1, further comprising the step of:

superimposing current amplitude values on the current amplitude during full-step, half-step or micro-step operation of the stepping motor.

7. A stepping motor control, comprising:

drive unit for driving windings of a stepping motor with currents having a time-variable amplitude and constant frequency, an output unit for outputting a plurality of amplitude values that change at a predetermined load moment of the stepping motor, and a control unit for controlling output unit such that the amplitude values are output to the drive unit beginning at a starting time.

8. A method for operating a stepping motor, comprising the steps of:

driving windings of the stepping motor with current pulses having a defined current amplitude;

determining load moment characteristic over speed in a measuring procedure;

determining drive moment characteristics of the stepping motor over the speed for a plurality of current amplitude through;

predetermining a time curve of the speed of the stepping motor according to a ramp function;

selecting from a drive moment characteristic dependent on respective speed value current amplitude at which torque reserve from drive moment minus load moment lies within a predetermined range; and after determination of the load moment characteristic driving the stepping motor beginning at a starting time with current pulses of the selected current amplitudes according to the predetermined speed curve so that cycle duration of the winding currents changes according to the predetermined speed curve.

9. A method according to claim 8, further comprising the step of:

driving a part of the transport system for transporting sheet-shape carrier material in an electrophotographic printer by the stepping motor.

10. A method according to claim 8 further comprising the steps of:

superimposing current amplitude values the current amplitudes in simple full-step, half-step or micro-step operation of the stepping motor.

11. A stepping motor control, comprising:

a drive unit for driving windings of a stepping motor with currents having a time-variable amplitude;

an output unit for outputting at least one curve of the speed of the stepping motor and for outputting a curve of current amplitude values allocated to the speed curve; and a control unit for controlling the output unit such that the amplitude values are output to the drive unit beginning at a starting time synchronously with the variation of the speed according to the speed curve, the torque reserve of the stepping motor from drive moment minus load moment lies within a predetermined range.

* * * * *